Patented Sept. 15, 1942

2,296,066

UNITED STATES PATENT OFFICE 2,296,066

PIGMENT MATERIALS AND PROCESS OF MAKING THE SAME

Clifford K. Sloan, Woodside Hills, Del., assignor to E. I. du Pont de Nemours & Company, Wilmington, Del., a corporation of Delaware No Drawing. Application September 5, 1940, Serial No. 355,460

11 Claims. (Cl. 106—308)

This invention relates to the production of finely divided pigment materials and more particularly to a process of making substantially water insoluble pigment materials of such fineness that they can be used in coating compositions without the necessity of milling said compositions.

It is well known in the art that many pigment materials such as titanium dioxide, titanates, barium sulfate, lithopone, zinc sulfide, and the like, often contain relatively large quantities of coarse aggregates. Thus lithopone, produced by calcination or other treatment of the reaction product obtained by mixing together solutions of barium sulfide and zinc sulfate respectively, contains hard gritty particles. These particles prevent the formation of a smooth, unbroken, and glossy film of a coating composition when made from such a product. This detrimental property of such pigments is a direct result of the conditions obtaining in their method of manufacture. The precipitation step tends to form aggregates of fine particles and the subsequent treatments, such as drying and calcination, cement these aggregates by compacting and sintering.

It has long been recognized in the art that pigment materials must be in a relatively finely divided condition to insure the formation of paints capable of producing smooth and glossy paint films when said pigment materials are milled with paint vehicles. Furthermore, the present tendency on the part of the pigment users is to demand pigment materials which are even more finely divided than heretofore and which can be incorporated in a paint vehicle by simple mixing or stirring, to produce a paint which forms films of smooth, unbroken surface without any irregularities visible to the naked eye. Pigment materials manufactured by prior art processes do not fulfill this requirement.

A commonly used method of producing finely divided pigment materials is by wet-milling. Substantial improvements in the art of wet-milling lithopone and titanium dioxide pigments are disclosed, for example, in U. S. Patents 1,826,131, 1,937,037, and 2,044,941. These processes comprise a continuous grinding and hydroseparation circuit in which the calcined pigment material is ground and deflocculated in aqueous media with the aid of deflocculating agents and the fines are separated from the coarse by hydroseparation and the coarse reground. The overflow fraction, constituting a deflocculated suspension of pigment particles having substantially a particle size of 15 microns or less, is coagulated in order to permit economical separation of the pigment from the water, and the pigment is then filtered and dried. The coagulation operation forms aggregates of the fine particles and the subsequent drying treatment tends to cement these aggregate together, thus largely offsetting the beneficial effects of the prior wet-milling process. As a consequence, dry-milling of the dried wet-milled pigment is resorted to in order to break up the lumps formed on drying. This dry-milling effects subdivision which is satisfactory for some purposes. However, it does not produce pigment materials, such as lithopone or titanium oxide pigments, which can be mixed in paint vehicles without milling of the paint to produce smooth glossy coatings.

I am aware that U. S. Patent 1,722,174 disclosed a process of improving the mixing and dispersing properties of lithopone in paint vehicles which comprises treating the calcined lithopone with a water soluble soap. I am also aware that U. S. Patent 1,978,727 also discloses a process of improving the dispersing properties of lithopone in paint vehicles which comprises adding a small amount of a salicyl compound to the calcined lithopone. I am also aware that U. S. Patent 2,068,066 also discloses a process of improving the smoothness of paints made by grinding pigment materials in paint vehicles which comprises treating said pigment materials with an aliphatic organic acid. While the products of these and other prior art processes may be milled in a paint vehicle to produce paints of satisfactory smoothness, they do not, when incorporated in a paint vehicle by simple mixing, produce a paint even sufficiently smooth for use as a flat paint of the interior wall finish type. In addition, such prior art pigments do not have satisfactory mix-in pigment particle size or film particle count properties as measured by the herein described tests.

For a better understanding of the characteristics desired in finely divided pigment materials it will be necessary to explain the various terms used herein and the methods of testing employed.

*Mix-in pigment particle size*

The term "mix-in pigment particle size," as used herein and in the appended claims, refers to the size of the discrete particles and aggregates of a dried finished pigment in a paint composition prepared by simple mixing of pigment and paint vehicle. More particularly, it relates to the number of discrete pigment particles or aggregates of pigment particles in said paint composition which are larger than a predetermined size such as 6 microns, 8 microns, or 15 microns.

To determine mix-in pigment particle size, 500 grams of pigment and approximately 100 grams of a linseed oil vehicle consisting of "Z" body kettle bodied linseed oil of 11 acid number, and petroleum spirits as defined by A. S. T. M. Tentative Standard D235-26T issued 1926, in the proportions of 52% by weight "Z" body kettle bodied linseed oil and 48% by weight petroleum spirits, are mixed for 20 minutes in a pony mixer of the type referred to at page 1283 of Perry's "Chemical Engineers' Handbook" (1934). Said mixer is provided with a receptacle or pot 7 inches in diameter and 5 inches deep rotating at the rate of 60 revolutions per minute, the paddles of said pony mixer rotating in the reverse direction at the rate of 6 revolutions per minute. The actual weight of linseed oil vehicle employed varies with the nature of the pigment being tested. The linseed oil vehicle is added to the 500 grams of pigment in just sufficient amount so that the paste obtained at the end of 20 minutes mixing in the aforementioned pony mixer gives a penetrometer reading of 25 mm. with 150 gram load, when tested according to the procedure outlined at pages 596-597 of the 8th (January, 1937) edition of "Physical and Chemical Examination of Paints, Varnishes, Lacquers and Colors," by Henry A. Gardner, and employing the cone type penetrometer specified for A. S. T. M. Tentative Standard D217-27T, described at pages 930-34 to the "Proceedings of the American Society for Testing Materials," vol. 27, part I (1937). The sides and paddles of the pony mixer are scraped down at the end of 1 minute of mixing time and again at the end of the 20 minute mixing period. An additional quantity of the aforementioned linseed oil vehicle is then added to the paste in amount sufficient to provide 250 grams of said vehicle in the paste; the mixture is stirred for an additional minute in the pony mixer and is then removed from said mixer. A sample of said paste is diluted to a concentration of 1.163 cubic centimeters pigment per liter thinned paint by stirring with an additional amount of the linseed oil vehicle used in the preparation of said paste. In the case of lithopone this corresponds to the provision of a thinned paint comprising 5 grams pigment per liter. A sample of the thinned paint so obtained is placed in a 100 micron deep glass cell and examined at 500 diameters magnification using transmitted light from a carbon arc. A pigment which by this test shows less than 100 particles per 0.00025 cubic centimeter of thinned paint that are larger than 6 microns in diameter, and not more than one that is larger than 11 microns in diameter, is defined as having a mix-in pigment particle size of 6 microns, and in most instances may be incorporated readily in a paint vehicle by simple mixing to produce a paint which forms paint films of a perfect mirror-like appearance. A pigment which shows less than 100 particles that are larger than 8 microns and not more than one larger than 13 microns per 0.00025 cubic centimeter is defined as having a mix-in pigment particle size of 8 microns, and in most instances may be incorporated readily in an enamel paint vehicle by simple mixing to produce an enamel which forms a smooth glossy paint film eminently suited for high grade enamel finishes. A pigment which by the above test shows less than 100 particles that are larger than 15 microns and not more than one larger than 20 microns is defined as having a mix-in pigment particle size of 15 microns, and is particularly adapted to making flat paints of the interior wall finish types and in most instances may be incorporated readily in a paint vehicle by simple mixing to produce a paint which forms films of smooth unbroken surface without any irregularities visible to the naked eye. A pigment which by the hereinabove described mix-in pigment particle size test shows less than 100 particles that are larger than $n$ microns in diameter and not more than 1 particle that is larger than $n^{+5}$ microns in diameter is defined as having a mix-in pigment particle size of $n$ microns. A lithopone, for example, meeting these requirements will contain less than 100 particles larger than $n$ microns in diameter and not more than 1 particle larger than $n^{+5}$ microns in diameter, in $12.5 \times 10^{-7}$ grams pigment, which appear as particles of the above mentioned sizes in a paint prepared by simple mixing of pigment and vehicle.

It is to be understood that the values for mix-in pigment particle size as hereinabove determined differ markedly from those for pigment particle size as heretofore determined by prior art testing methods. Mix-in pigment particle size is an actual measure of the fineness of a pigment incorporated in an organic coating composition by simple mixing without milling of said coating composition in a pebble mill, paint roller mill, or the like. On the other hand, prior art pigment particle size measurements give particle size results which in practice are only obtained with difficulty, if at all, after prolonged milling of pigment and coating composition vehicle in milling devices such as those aforementioned. In preparing the pigment sample for particle size determination by prior art methods, for example, by the tentative standard method E-20-23-T section 10, 1933 of the American Society for Testing Materials, the pigment is dispersed in the vehicle on a microscope slide by prolonged and severe rubbing which effects subdivision or removal of all cemented pigment aggregates. In paint manufacturing practice, however, aggregates are not broken down by simple mixing of pigment and vehicle and, in fact, often persist after prolonged milling of pigment and vehicle.

*Film particle count*

The term "film particle count," as used herein and in the appended claims, refers to the number of particle and aggregates of a dried finished pigment which appear as objectionable grit in a dried film of paint composition prepared by simple mixing of pigment and paint vehicle. More particularly, it relates to the number of projections above the surface of said film having diameters of 50 microns or more.

A suitable method for determining film particle count comprises mixing 500 grams pigment and sufficient of a vehicle consisting of 75% by weight "Z" body kettle bodied linseed oil of 11 acid number, and 25% by weight petroleum spirits as defined by A. S. T. M. tentative standard D235-26T issued 1926, to provide a pigment-vehicle mixture comprising 35.7% pigment by volume and 64.3% vehicle by volume, for 20 minutes in a pony mixer, such as set forth at page 1283 of Perry's 1934 "Chemical Engineers' Handbook," and provided with a receptacle or pot 7 inches in diameter and 5 inches deep, adapted to rotate at the rate of 60 revolutions per minute and the paddles of which pony mixer rotate at the rate of 64 revolutions per minute in the reverse direction. The sides and paddles of the pony mixer are scraped down at the end of 1 minute of mixing time and again at the end of the 20 minute mixing period. The thick pigment-vehicle mixture thereby produced is passed once through a three-roll paint roller mill having rolls 6 inches in diameter and with 0.003 inch clearance between said rolls. The first roll in said mill rotates at a speed of 21 revolutions per minute; the second at 63 revolutions per minute; and the third at 189 revolutions per minute. Passage of said mixture through the paint roller mill set with such wide clearance between the rolls effects little if any grinding of the pigment material, but does insure thorough and reproducible mixing of the pigment and vehicle. A 300 gram sample of the resultant mixed thick paint is diluted with more of the linseed oil vehicle to provide a paint consisting of 17.6% pigment by volume and 82.4% linseed oil-petroleum spirits vehicle by volume. Petroleum spirits are then added with stirring in sufficient amount to produce a paint having a consistency of 5.0N, as determined by the modified Stormer Viscometer described at pages 1272–77 of Perry's "Chemical Engineers' Handbook" (1934). The resultant paint is allowed to stand 20 hours, after which 0.7% by weight of 6% cobalt naphthenate drier and 1.8% of 24% lead naphthenate drier, on the basis of the vehicle weight, are added with stirring. The thinned paint is strained through a 48 thread per inch x 60 thread per inch cotton paint strainer and spun out on a "Pyralin" slide rotating at 480 R. P. M. The film so produced is allowed to dry in a dust-free atmosphere and is then examined at 20 diameters magnification, under illumination at an angle of 18° 26′ 12″, using a high intensity microscope lamp, and the number of projections, noted per 10 square centimeters of paint film, above the surface of said film having diameters of 50 microns or more, are counted. The numerical figure thereby obtained is defined as "film particle count." It is to be understood that the projections above the surface do not necessarily represent pigment particles or pigment aggregates having diameters of more than 50 microns, but that they are projections comprising pigment particles or pigment aggregates plus dried oil film having a total diameter of 50 microns or more. In most instances, the pigment particles or aggregates of themselves will be responsible for little more than half the total diameter of said projections.

Having explained the terms to be used herein, I can now proceed with a detailed description of my invention.

This invention has an object the improvement of the mix-in pigment particle size and film particle count properties of pigment materials. A further object is the production of pigment materials of such fineness that they can be mixed with paint vehicles to produce coating compositions, such as enamel and flat paints, without recourse to the coating composition milling operation required with prior art pigment materials. A still further object is the production of a mix-in pigment comprising minor amounts of an anion active and a cation active polar non-polar agent. Additional objects will become apparent from an examination of the following description and claims.

These and other objects and advantages are accomplished according to the herein described invention which broadly comprises separately adding a cation active and anion active polar-nonpolar agent to an aqueous pigment system, dewatering, and thereafter drying the pigment at a temperature not exceeding about 200° C.

In a more restricted embodiment this invention comprises separately adding to an aqueous slurry of a wet-milled pigment, preferably hydroseparated wet-milled pigment, between about 0.01% to about 10%, based upon the weight of the pigment in the slurry, of an anion active polar-nonpolar agent and between about 0.01% to about 10% of a cation active polar-nonpolar agent. The slurry is then dewatered, as by centrifuging or by coagulating and filtering, and the pigment dried at a temperature not exceeding about 175° C. and dry-milled.

The preferred embodiment of this invention comprises adding to an aqueous pigment slurry between about 0.01% to about 0.5%, based upon the weight of the pigment in the slurry, of an alkaline deflocculating agent. The deflocculating agent employed may be any one of a class of alkaline reacting alkali metal compounds. The alkali metal salts of phosphoric acids have been found to be very effective deflocculating agents. The deflocculation should be controlled closely and I have found that the alkalinity of the slurry should be between a pH of about 7.2 to about 12. The deflocculated aqueous pigment slurry is divided into two portions and to one portion is added between about 0.2% and about 1%, based upon the weight of the pigment in the slurry, of a substantially water-soluble anion active polar-nonpolar agent, preferably a polar-nonpolar agent selected from the group consisting of animal and vegetable fatty acid soaps. To the other untreated portion of pigment slurry is added a substantially water-soluble cation active polar-nonpolar agent, preferably an agent in which there is but one nitrogen atom and in which the long chain hydrocarbon radical is directly attached thereto, e. g., octadecyl trimethyl ammonium bromide in an amount chemically equivalent to the anion active agent added to the aforementioned other portion. A coagulant, preferably sulfuric acid, is added in an amount sufficient to reduce the pH of the pigment suspension to about 3.5. Thereafter, the pH of the pigment suspension is adjusted to above about 7 by addition of barium hydroxide and the pigment is filtered, dried at a temperature not exceeding about 150° C., and dry-milled.

Various arrangements and selections of equipment for the operation of my process are possible. In the preferred arrangement, however, I feed an aqueous suspension of unground pigment, containing about 12 parts by weight of water in which is dissolved the deflocculating agent to 1 part by weight of pigment, to a continuous ball or tube mill which is fed by either a tube extending into the end of the mill or by a scoop feeder. In passing through the mill the product is ground and the mill discharge is fed continuously into a hydroseparator or other pigment slurry classifier. The fines are overflowed and the coarse returned to the ball mill. A small amount of a substantially soluble, anion active polar-nonpolar agent is added to the overflow from the hydroseparator tank and said treated overflow is conducted to a smaller mechanically agitated receiving tank to which a substantially water soluble cation active polar-nonpolar agent is added. The pigment suspension is then conducted to a second small mechanically agitated receiving tank to which a coagulant is added. The flocculated suspension is then passed to a second settling tank. The pigment settles rapidly to form a slurry containing about 2 parts of water to one part pigment. This slurry is filtered, dried and after dry-milling as in a rotary hammer mill is ready for use.

The following examples are given for illustrative purposes and are not intended to place any restrictions on the herein described invention.

*Example I*

A mixture of coarse and fine calcined lithopone, to which had been added 0.15% hydrated sodium pyrophosphate, was fed to the center of a 30 ft. hydroseparator tank at 32° C. The upward rate was 0.015 cm./sec. For this rate the calculated maximum particle size of completely dispersed lithopone in the overflow was 8 microns in diameter. 100 liters of the overflow, containing 80 grams per liter of the completely dispersed pigment, comprising lithopone particles essentially all of a particle size of 8 microns or less, was placed in a suitable container and agitated with a high speed mixer. 320 cubic centimeters of a 10% solution of cotton seed oil fatty acid sodium soap was added to this slurry. The mixture was agitated for a period of 30 minutes whereupon an amount of dodecyl amine hydrochloride chemically equivalent to that of the previously added cottonseed oil fatty acid sodium soap, was added and agitation was continued for another 30 minutes. Sulfuric acid was then added to a pH of 3.5 and the agitation was stopped. After settling overnight the supernatant liquid was decanted. The alkalinity of the slurry (1 part of pigment to 2 parts of water) was adjusted with barium hydroxide to a pH of 9.6. After the correct adjustment had been made the batch was filter pressed, dried at 125° C. and disintegrated by passage through a squirrel cage disintegrator. The lithopone pigment thus produced by my novel process had a mix-in pigment particle size of 7 microns and a film particle count of 25. On the other hand, a prior art lithopone pigment prepared in identically the same manner except that addition of the anion active and the cation active polar-nonpolar agent was omitted, had a mix-in pigment particle size of 25 microns and a film particle count of 215. When incorporated in a linseed oil vehicle by simple mixing the novel pigment of my invention provided a coating composition equal in fineness and smoothness characteristics to that only had when the comparable prior art pigment was incorporated in a comparable vehicle by severe milling, as in a pebble mill.

*Example II*

A calcined lithopone slurry substantially devoid of particles greater than 8 microns in diameter and comprising 8 kilograms of pigment and 16 kilograms of water was placed in an agitated vessel and 320 cc. of a 10% solution of dodecyl amine hydrochloride was added thereto. Agitation was continued and there was then added to the suspension a 10% solution of cottonseed oil fatty acid sodium soap in an amount chemically equivalent to the dodecyl amine hydrochloride previously added. Barium hydroxide was then added in an amount sufficient to raise the pH of the suspension to 9.6, after which said suspension was filter pressed, dried at 125° C., and disintegrated by passage through a squirrel cage disintegrator. The novel lithopone product thus obtained had a mix-in particle size of 8 microns and a film particle count of 35, whereas, as illustrated in Example I, the comparable prior art lithopone had a mix-in pigment particle size of 25 microns and a film particle count of 215. In other words, the novel product of my invention produced enamel paints when simply mixed in paint vehicles, whereas the prior art lithopone required prolonged milling in paint vehicles to effect equal results.

*Example III*

750 grams calcined lithopone was placed in a gallon ball mill. 1.5 liters water and 3 grams hydrated sodium pyrophosphate were added. The mixture was allowed to grind for 24 hours. Upon completion of this time, the contents were removed and placed in a large elutriating funnel. Water at 30° C. was run in at the bottom at a rate controlled to give an overflow rate of 108 cc. per minute. This overflow rate corresponded to a theoretical particle size of 6 microns. When the collected overflow had reached a concentration of 50 grams per liter and a total weight of 400 grams of pigment, the elutriation was stopped. 32 cc. of a 5% solution of sodium naphthenate, i. e., 0.4% on the basis of pigment weight, was added with stirring. Thereafter an equivalent weight of octadecyl trimethyl ammonium bromide was added and agitation was continued for a period of 15 minutes, after which the pigment suspension was acidified to a pH of 3 by addition of sulfuric acid. The coagulated slurry thereby obtained was adjusted to a pH of 9.4 by addition of barium hydroxide, was filtered, dried at a temperature of 125° C., and disintegrated by passage through a squirrel cage disintegrator. The pigment thus obtained had a mix-in pigment particle size of 6 microns and a film particle count of 25. On the other hand, a comparable lithopone prepared in exactly the same manner except that the treatment with the anion active agent, namely, the sodium naphthenate and the treatment with the cation active agent, namely, the octadecyl trimethyl ammonium bromide, was omitted, had a mix-in pigment particle size of 35 and a film particle count of 295. In other words, the novel product of my invention produced enamel paints when simply mixed in paint vehicles whereas the prior art lithopone required prolonged milling in paint vehicles to effect equal results.

*Example IV*

Two tanks of equal size were filled with a slurry of calcined lithopone, said slurry being devoid of particles greater than 8 microns in diameter and the concentration of the pigment being 4 lbs. per gallon. 0.25% of octadecyl trimethyl ammonium bromide, on the basis of the pigment, was added to one of the aforementioned tanks and incorporated in the pigment slurry by agitation. To the other aforementioned tank was added an amount of a sodium soap of an animal fatty acid (chiefly oleic) chemically equivalent to the octadecyl trimethyl ammonium bromide added to the other tank, and said sodium soap was incorporated in the pigment slurry by agitation. The contents of the two tanks were mixed together with agitation after which the pH was adjusted to 8.5 with barium hydroxide. The finished slurry was then filter pressed, dried at 130° C., and disintegrated by passage at the rate of 7000 lbs./hr. through a 24 in. rotary hammer mill. The pigment thus produced had a mix-in pigment particle size of 5 microns and a film particle count of 17, whereas a comparable prior art pigment identical in all respects except that the treatment with octadecyl trimethyl ammonium bromide and the animal fatty acid soap was omitted had a mix-in pigment particle size of 30 and a film particle count of 248. When mixed in a paint vehicle, in a pony mixer, for example, my novel pigment produced an enamel paint of high gloss whereas the prior art pigment produced a paint too gritty even for use as an interior flat wall paint.

*Example V*

Partially ground calcined titanium dioxide slurry containing 0.15% sodium hydroxide and overflowing from a hydroseparator tank at a 4 micron rate was allowed to overflow for 24 hours before a sample was taken. 300 liters of this overflow containing 190 grams titanium dioxide per liter was agitated in a 100 gallon tank. This slurry was completely dispersed, substantially no particles being larger than 4 microns in diameter. There was then added with stirring 0.4%, on the basis of the titanium dioxide weight, of sodium naphthenate. Agitation was continued for a half hour whereupon dodecyl amine hydrochloride in an amount chemically equivalent to the weight of added sodium naphthenate was added to the agitated slurry and agitation was continued for half an hour. A solution of magnesium sulfate in dilute sulfuric acid, comprising 5 parts $MgSO_4.7H_2O$ to 2 parts $H_2SO_4$ by weight, was added in an amount sufficient to lower the pH to 7.1. The slurry was allowed to settle for a period of 16 hours when a density of 320 grams per liter was observed. The pigment was filtered, dried at 130° C. and disintegrated by passage through a rotary hammer mill. The titanium dioxide pigment thus produced had a mix-in pigment particle size of 6 microns and a film particle count of 40. On the other hand, when the calcined titanium dioxide pigment was dispersed with 0.15% sodium hydroxide and elutriated at a 4 micron rate, but not treated with an anion active or cation active polar-nonpolar agent, the pigment produced had a mix-in particle size of 25 microns and a film particle count of 212.

*Example VI*

To an aqueous slurry of calcined medium oil absorption lithopone, comprising 1 lb. lithopone per gallon of water, were added 0.5% sodium silicate and 0.04% sodium pyrophosphate on the basis of the weight of the lithopone, and said slurry was fed continuously at the rate of 10,000 lbs. per hour to a wet grinding system equipped with hydroseparator tank. To the overflow from the hydroseparator tank, comprising approximately 1 lb. per gallon of lithopone particles substantially perfectly dispersed and having a particle size of less than 6 microns, was added 0.5%, based on the weight of the pigment, of a sodium soap of coconut fatty acid, the soap being added as an aqueous 6.7% solution. The resultant treated overflow was conducted to a smaller agitator tank and there was added continuously dodecyl amine hydrochloride in an amount chemically equivalent to the previously added coconut fatty acid soap. The overflow from this second tank was then acidified by addition of sulfuric acid to a pH of between 2.5 and 3 and the resultant coagulated slurry was thickened to a concentration of approximately 3 lbs. pigment per gallon. Zinc sulfate was added in an amount sufficient to provide a lithopone, on subsequent neutralization, comprising 0.12% ZnO, and the pH of the pigment slurry was adjusted to 7 by addition of barium hydroxide. A slurry of neutral, coagulated, calcined titanium dioxide was then added in an amount sufficient to provide a mixed pigment comprising 15.5% $TiO_2$ and 84.5% lithopone. The resultant pigment slurry was agitated sufficiently to effect uniform distribution of the titanium dioxide, when said slurry was adjusted to a pH of 9.8 by addition of barium hydroxide, filtered, and the pigment dried at 130° C. and dry-milled by passage at the rate of 7000 lbs./hr. through a 24 in. rotary hammer mill. The resultant novel product of my invention had a mix-in pigment particle size of 6 microns and a film particle count of 24, whereas a prior art pigment prepared in an identical manner except that the treatment with coconut fatty acid soap and dodecyl amine hydrochloride was omitted, had a mix-in pigment particle size of 21 microns and a film particle count of 185.

It is to be understood that the hereinbefore disclosed specific embodiments of my invention may be subject to variation and modification without departing from the scope thereof. While it is not essential that the pigment material should be in a deflocculated condition when the anion active and the cation active polar-nonpolar agents are added to an aqueous suspension thereof, it is essential that the discrete particles of said pigment material should be in a finely divided condition. Said fine subdivision is effected most readily by wet-milling of an aqueous deflocculated suspension of the pigment material and thereafter subjecting the wet-milled pigment material to a hydroseparation operation, or other pigment classification operation. In effecting said wet-milling and hydroseparation the deflocculated pigment suspension should not be too concentrated as high concentration of solids interferes with the separation of the coarse and fine particles. For most ordinary purposes, concentrations of 1 part pigment to from about 7 to about 15 parts of water are preferred.

Deflocculation of the pigment suspension must be controlled closely, but may be effected by alkaline deflocculating agents or by acid deflocculating agents. With white pigments I have found that the alkalinity of the slurry should be between a pH of about 7.2 to about 12, and preferably between about 8 and about 10. The particular type of alkaline deflocculating agent which is employed is of great importance. The alkaline deflocculating agent employed may be any one of the class of alkaline reacting alkali metal compounds, which term includes ammonium compounds, or any combination of said alkali metal compounds. Sodium hydroxide, potassium hydroxide, ammonium hydroxide, sodium carbonate, potassium carbonate, sodium silicate, potassium silicate, sodium aluminate, potassium aluminate, sodium phosphates, and potassium phosphates are examples of alkaline deflocculating agents suitable for use in my novel process. However, my preferred alkaline agents, because of their superiority over other agents, are alkali metal salts of phosphoric acids, e. g., of orthophosphoric acid, pyrophosphoric acid, metaphosphoric acid, and the like. The alkali metal salts of the phosphoric acids which I prefer to employ are the sodium salts of pyrophosphoric acid, either as the hydated salt, $Na_4P_2O_7.10H_2O$, or the anhydrous salt, $Na_4P_2O_7$. The optimum amount of alkaline deflocculating agent which is employed can best be learned by experimental trial. With the agent which I have found most satisfactory viz., hydrated sodium pyrophosphate, appreciable effects are had by addition of an amount as small as about 0.01% of agent, based upon the weight of the pigment in the slurry. For increased effects, as much as about 0.5% and even as high as about 1% of hydrated sodium pyrophosphate may be used. If an amount of deflocculating agent substantially greater than about 1% is used it deleteriously affects the fineness properties of the finished pigment. I prefer to add the deflocculating agent in just a sufficient amount that a slurry comprising pigment and water in the proportion of 1 part pigment to about 7 parts water does not show any settling on standing for 10 mintues and contains no visible flocculent precipitate. For most ordinary purposes, the preferred amount of alkaline deflocculating agent used corresponds to between about 0.05% to about 0.2% of the weight of pigment in the slurry and the deflocculated pigment suspension has a pH of from about 8 to about 10.

While an alkaline defloculent is preferred in many instances, it is to be understood that deflocculation may also be effected by addition of an acid reacting deflocculent. By the term "acid reacting deflocculent" as used herein and in the appended claims is meant a member or admixture of members selected from the group consisting of monobasic acids, and acid reacting normal and basic salts thereof with a polyvalent metal having a valence of at least 3. Examples of monobasic acids are halogen acids such as hydrochloric acid, hydrobromic acid, and the like, oxygen containing monobasic inorganic acids such as sulfamic acid, chloric acid, bromic acid, iodic acid, perchloric acid, perbromic acid, periodic acid, nitric acid, and the like, monobasic organic acids such as acetic acid, chloracetic acid, and the like. Polyvalent metals having a valance of at least 3, the acid reacting normal and basic salts of which with monobasic acids are useful deflocculents, include aluminum, iron, cerium, titanium, zirconium, thallium, thorium, and tin. Specific examples of acid reacting salts useful as deflocculents include aluminum chloride, aluminum acetate, aluminum sulfamate, and the like, and acid reacting basic salts thereof such as basic aluminum chlorides, and the like, having a basicity of up to 60% or more, i. e., comprising 40% or less of that amount of chlorine which is theoretically required for the formation of the normal chloride. The aforementioned acid reacting deflocculents may be employed in an amount in the range of from about 0.1% to about 2% on the basis of the pigment weight, but for optimum effects I prefer to add said deflocculents in an amount in the range of from about 0.1% to about 0.5% on the basis of the pigment weight.

The optimum rate of upward flow of the deflocculated pigment suspension in the hydroseparator tank will vary with the particular pigment material used, temperature, type and quantity of deflocculent, type and quantity of the anion active cation active polar-nonpolar agents added, etc. In a well dispersed suspension such as that obtained with my preferred deflocculating agent, I have found that at 20° C. a rate of upward flow in the elutriating vessel of about 0.04 centimeter per second with calcined lithopone results in an overflow fraction constituting a deflocculated suspension of pigment particles having substantially all a particle size of about 15 microns or less. Addition of my preferred anion active and cation active polar-nonpolar agents to this pigment suspension, either in deflocculated or flocculated condition, and subsequent dewatering, drying and dry-milling results in the formation of a dry lithopone having substantially a mix-in pigment particle size of 15 microns or less and a film particle count of about 60 or less, as measured by the hereinbefore described mix-in pigment particle size and film particle count tests. This pigment is particularly adapted to making flat paints of the interior wall finish type. Furthermore, it may be incorporated readily in the paint vehicle by simple mixing to produce a paint which forms films of smooth unbroken surface without any irregularities visible to the naked eye. Under the hereinabove described conditions, decreasing the rate of upward flow in the elutriation vessel to about 0.011 cm. sec. with calcined lithopone results in the formation of a dry pigment having substantially a mix-in pigment particle size of about 8 microns or less and a film particle count of about 40 or less. This pigment may be incorporated readily in an enamel paint vehicle by simple mixing to produce an enamel paint which forms a smooth glossy paint film eminently suited for high grade enamel finishes. A further reduction in upward flow in the elutriation vessel to about 0.0064 cm. sec. with calcined lithopone results in the formation of a dry pigment having substantially a mix-in pigment particle size of about 6 microns or less and a film particle count of not in excess of about 25. This pigment may be incorporated readily into a paint vehicle by simple mixing to produce a paint which forms a paint film of a perfect mirror-like appearance. The rate of upward flow necessary to eliminate particles above a given size will vary with the temperature. Under the aforementioned conditions the rate practically doubles for a 35° C. rise in temperature.

Examples of anion active polar-nonpolar agents suitable for use in my novel process are compounds selected from the class having formulae

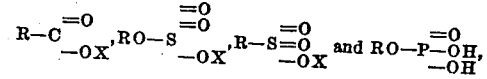

wherein R is either a cyclic or aliphatic radical containing at least eight carbon atoms and X is a hydrogen, ammonium, or a metal atom. Among specific examples of said anion active polar-nonpolar agents are included soaps such as sodium oleate, potassium stearate, ammonium palmitate, sodium laurate, sodium resinate, sodium linoleate, magnesium laurate, and the like; salts of alginic acid; sulfation products of oils such as sulfated olive oil, sulfated sperm oil, sulfated petroleum, and the like, and salts thereof; naphthenic acids and salts thereof such as sodium naphthenates and the like; sulfated higher alcohols such as oleyl, hexadecyl and octadecyl alcohol sulfates, sulfated coconut oil alcohols, and salts thereof, and in particular the sodium salts of the sulfuric acid esters of the aliphatic alcohols having from eight to twelve carbon atoms.

Among cation active materials used in the herein described invention are included all materials which in aqueous systems yield positive radicals having at least one alkyl group, which contains at least 8 carbon atoms. In the case of the amines and ammonium compounds, the long chain alkyl radical must be attached to the basic nitrogen atom either directly or through an alkoxy group. The term "alkyl" as used herein refers to monovalent acyclic hydrocarbon radicals. The alkyl group may carry substituents on the chain. The preferred compounds, however, are those in which the alkyl group is unsubstituted.

The first species of the general class of agents used in the practice of this invention consists of salts of nitrogen containing bases having but one nitrogen atom and which are characterized by having either a cycloalkyl or alkyl radical containing at least 8 carbon atoms attached directly to the basic nitrogen atom. The first species can be divided into two groups. As an example of the first of these groups, I may use water soluble amine compounds of either primary, secondary or tertiary character, the long chain amine compounds being solubilized by methods including salt formation with water soluble inorganic acids or by formation of hydroxy or carboxy derivatives of these long chain amines. As specific representatives of long chain amines that can readily be solubilized by addition of acids like sulfuric, hydrochloric, etc., I may utilize dodecyl amine, hexadecyl amine, octadecyl amine, 9,10-octadecenyl amine, and the corresponding secondary or tertiary alkyl derivatives of the same, i. e., dodecyl dimethyl amine, didodecyl amine, octadecyl diethyl amine, etc. A second group of the first species of the above nitrogen containing species consists of quaternary ammonium compounds containing at least one alkyl group containing 8 or more carbons or an alkyl chain containing 8 or more carbons in the alkyl radical. Representative compounds of this class include octadecyl trimethyl ammonium bromide, hexadecyl trimethyl ammonium bromide, dodecyl pyridinium sulfate, dodecyl pyridinium bromide, dodecyl pyridinium chloride, hexadecyl pyridinium bromide, octadecyl pyridinium bromide, octadecyl oxymethyl pyridinium chloride, octadecyl choline chloride, etc. Long chain betaines such as octadecyl betaine are useful for my purpose, being related to this type of species. A second species of the class operative in the present invention consists of water soluble salts of organic compounds which are characterized by having at least one ternary sulfonium residue to which is attached at lease one alkyl chain containing 8 or more carbon atoms. As specific representatives of this species including compounds in which the sulfur atom has a positive valence of 4 are to be included: methyl benzyl octadecyl sulfonium methyl sulfate, dodecyl dimethyl sulfonium methyl sulfate, etc. A third species of the class operative in the present invention includes phosphorous compounds similar in structure to the nitrogen containing compounds described under the first species. They include water soluble salts of organic compounds which are characterized by having at least one phosphonium residue to which is attached at least one aliphatic group containing an aliphatic residue of at least 8 carbon atoms.

It is to be understood that the anion active polar-nonpolar agent and the cation active polar-nonpolar agent must be added to the pigment suspension separately. Said separate addition may be effected in a variety of ways. Thus, I may add one of the agents to the pigment suspension and thereafter add the other type of polar-nonpolar agent to the suspension, agitation preferably being continued during the addition of said agents. However, I prefer to add the anion active agent to one portion of the pigment slurry and the cation active agent to another portion of the pigment slurry and thereafter may mix the two slurries.

The optimum amount of anion active and cation active polar-nonpolar agents employed can best be learned by experimental trial and will depend to a large extent on the character of the pigment material under treatment and the use requirements of said pigment material. Appreciable effects are had by addition of as little as about 0.01%, based upon the weight of pigment in the slurry, of anion active polar-nonpolar agent and of cation active polar-nonpolar agent respectively. For white pigments amounts in excess of 2% of the agent, based on the pigment, should not be used since the effectiveness of the agent decreases with increasing amounts of agent. For pigments having a higher specific surface than the white pigments, amounts up to and including 10% are required for optimum results. Generally I employ from about 0.01% to about 5% and preferably from about 0.2% to about 1% of anion active agent and of cation active agent respectively. Furthermore, for optimum effects I prefer to employ said agents in chemically equivalent amounts.

It is to be understood that the pH of the polar-nonpolar agent treated flocculated pigment suspension should be adjusted to 7 or higher prior to dewatering of said suspension. Such adjustment may be effected by addition of alkaline compounds, preferably barium hydroxide.

While I prefer to effect dewatering of my cation active and anion active agent treated pigment dispersion by effecting flocculation of said treated dispersion, allowing the resultant coagulated suspension to settle to a thick slurry, and thereafter filtering said slurry to produce a pigment cake comprising from about 40% to about 65% pigment by weight, it is to be understood that dewatering may be effected by other methods well known in the art. For example, the pigment suspension after treatment with the anion active and cation active agents may be dewatered by centrifuging with or without addition of further coagulating or flocculating agents.

It is to be understood that it is essential that the treated pigment should not be dried at a temperature exceeding about 200° C. since higher temperatures will completely nullify the improved properties of the pigment resulting from the herein described previous treatment.

I have found it very desirable in practicing my invention to effect hydroseparation of the pigment according to processes such as those described in U. S. Patents 1,826,131, 1,937,037, and 2,044,941, and thereafter to add the anion active and the cation active polar-nonpolar agents to the finely divided pigment thereby obtained. However, it is to be understood that hydroseparation is not a part of this invention and is not an essential step in my process. For example, the polar-nonpolar agents may be added to an aqueous suspension of a wet-milled calcined pigment dispersion which has not been hydroseparated. While I prefer to employ in my process pigments which have been wet-milled and/or hydroseparated so that the pigment slurry is substantially free from pigment particles having a diameter greater than about 15 microns, and the product of my process has a mix-in pigment particle size of about 15 microns or less and a film particle count not in excess of about 60, it is to be understood that the polar-nonpolar agents may be added to an aqueous pigment suspension comprising a relatively large amount of pigment particles having a diameter greater than about 15 microns and producing by my process a pigment suitable for direct incorporation into coating composition vehicles by simple mixing, whereby a homogeneous pigment vehicle mixture is formed, said pigment having a mix-in pigment particle size substantially greater than about 15 microns.

The dried pigment obtained by my novel process is in a relatively soft and powdery condition. The polar-nonpolar agents added to the pigment dispersion or suspension react to form a surface coating on the individual pigment particles even when said particles are treated when in the form of loosely held flocs, thereby completely preventing cementation of the soft pigment flocs during the drying process. As a consequence, simple dry-milling comminutes the dried pigment so that on simple mixing in paint vehicle it is reduced substantially to the state of subdivision existent in the pigment dispersion prior to flocculation. I prefer to dry-mill by disintegrating as in a rotary hammer mill, although pulverizing as in a ring roll mill may be resorted to.

While my process is applicable to substantially water insoluble pigment materials or admixtures of substantially water insoluble pigment materials consisting in whole or in part of such pigment materials as titanium dioxide, extended titanium dioxide, titanates of divalent metals, zirconium oxide, zirconium silicate, barium titanium silicate, barium sulfate, ground barytes, magnesium silicates, clay, lithopone, calcium carbonate, barium carbonate, silica, aluminum silicates, zinc sulfide, zinc oxide, antimony oxide, white lead, alumina, magnesium fluoride, calcium fluoride, carbon pigments, tinted titanium dioxide, ultramarine blue, chrome yellow, basic zinc chromates, chrome red, chrome orange, barium chromate, chrome green, iron blue, earth colors such as iron oxide, extended colors, and the like, it is to be understood that it is particularly adapted to substantially water insoluble white pigment materials, especially "zinc sulfide pigments" by which term is meant substantially water insoluble white zinc sulfide comprising pigments, for example, zinc sulfide, lithopone, and zinc sulfide extended with such substantially water insoluble white materials or admixtures of such substantially water insoluble white materials as barium sulfate, titanium dioxide, titanates of divalent metals, zirconium oxide, magnesium silicate, and the like. It is further to be understood that in the case of such pigments as titanium dioxide, lithopone, and the like which are calcined during the process of manufacture of said pigments, the polar-nonpolar agents are added to the calcined pigment and not to the pigment before the calcination operation.

The ready adaptability to direct mix-in which pigment substances treated in accordance with my invention afford will be evident at once upon evaluating and testing such treated substances, in accordance with the mix-in particle size and film particle count tests referred to. Prior art pigment materials exhibit mix-in pigment particle size values in excess of substantially 20 microns and film particle count values ranging from above 150 to in excess of 200. In order to render such pigment materials useful in paint compositions they must be ground for prolonged periods in the coating composition vehicle. In the present invention, on the other hand, treatment of pigment useful substances affords attainment of a product which will meet all mix-in pigment particle size and film particle count test requirements. The product thus becomes admirably suited for direct use and without any further grinding in the vehicle as a mix-in pigment. For instance, by following the teachings set out herein, pigments can be produced which never exhibit a mix-in pigment particle size value in excess of substantially 15 microns or a film particle count value in excess of substantially 60. Usually, my novel products exhibit mix-in pigment particle size values not exceeding substantially 8 microns, and preferably not exceeding substantially 6 microns, with film particle count values not in excess of substantially 40 and preferably not in excess of substantially 25.

My comminution process possesses advantages not previously combined in a single process. Furthermore, the products of my process possess advantages not previously combined in a single pigment material. For example, my novel process allows the production of dry, calcined, substantially water insoluble pigment materials which are finely divided to an extent heretofore unrealized by any commercially practicable prior art process or combination of processes, and which without recourse to the paint grinding operation, required with prior art calcined pigment materials, may be incorporated in a paint vehicle by simple mixing to produce a paint which forms films of smooth unbroken surface without any irregularities visible to the naked eye. Furthermore, dry calcined substantially water insoluble pigments of any predetermined particle size may be produced by my process, thus permitting the formulation of paints by simple mixing which will yield films of any predetermined gloss characteristic and of smooth unbroken surface. Furthermore, while I prefer to treat the pigment material with the aforementioned polar-nonpolar agents while said pigment is dispersed in aqueous media, my process is not limited to the use of such deflocculated suspensions. Products which will meet all mix-in pigment particle size and film particle count test requirements as hereinbefore described may be had when said polar-nonpolar agents are added to relatively concentrated flocculated suspensions of wet-milled pigment materials, thereby avoiding the handling of the large quantities of water necessarily present when a polar-nonpolar agent or combination of polar-nonpolar agents is added to the dilute pigment dispersion overflowing from the hydro-separator system.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. In a process for the preparation of dry pigments suitable for incorporation into oil paint vehicles by simple mixing, whereby a homogeneous pigment oil paint vehicle mixture is formed, the step which comprises separately adding an anion active polar-nonpolar agent and a cation active polar-nonpolar agent to an aqueous pigment system, and subsequently drying the pigment at a temperature not exceeding about 200° C.

2. In a process for the preparation of dry pigments suitable for incorporation into oil paint vehicles by simple mixing, whereby a homogeneous pigment oil paint vehicle mixture substantially free of pigment particles larger than 15 microns in diameter is formed, the steps which comprise separately adding an anion active polar-nonpolar agent and a cation active polar-nonpolar agent to an aqueous pigment system, thereafter dewatering the pigment system and subsequently drying the pigment at a temperature not exceeding about 200° C.

3. In a process for the preparation of dry pigments suitable for incorporation into oil paint vehicles by simple mixing, whereby a homogeneous pigment oil paint vehicle mixture substantially free of pigment particles larger than 15 microns in diameter is formed, the steps which comprise separately adding to a deflocculated pigment suspension substantially free of pigment particles larger than 15 microns in diameter, a cation active polar-nonpolar agent and an anion active polar-nonpolar agent, thereafter dewatering the pigment suspension and subsequently drying the pigment at a temperature not exceeding about 200° C.

4. In a process for the preparation of dry pigments suitable for incorporation into oil paint vehicles by simple mixing, whereby a homogeneous oil paint pigment vehicle mixture substantially free of pigment particles larger than 15 microns in diameter is formed, the steps which comprise separately adding to an alkaline reacting alkali metal compound deflocculated pigment suspension substantially free of pigment particles larger than 15 microns in diameter, an anion active polar-nonpolar agent and a cation active polar-nonpolar agent, thereafter dewatering the pigment suspension and subsequently drying the pigment at a temperature not exceeding about 200° C.

5. In a process for the preparation of dry pigments suitable for incorporation into oil paint vehicles by simple mixing, whereby a homogeneous pigment oil paint vehicle mixture substantially free of pigment particles larger than 15 microns in diameter is formed, the steps which comprise separately adding to an acid reacting deflocculated pigment suspension substantially free of pigment particles larger than 15 microns in diameter, an anion active polar-nonpolar agent and a cation active polar-nonpolar agent, thereafter dewatering the pigment suspension and subsequently drying the pigment at a temperature not exceeding about 200° C.

6. In a process for the preparation of dry pigments suitable for incorporation into oil paint vehicles by simple mixing, whereby a homogeneous pigment oil paint vehicle mixture substantially free of pigment particles larger than 15 microns in diameter is formed, the steps which comprise separately adding to an alkaline reacting alkali metal compound deflocculated pigment suspension substantially free of pigment particles larger than 15 microns in diameter, between about 0.01% and about 10%, based upon the weight of the pigment, of an anion active polar-nonpolar agent and between about 0.01% and about 10%, based upon the weight of the pigment, of a cation active polar-nonpolar agent, thereafter dewatering the pigment suspension and subsequently drying the pigment at a temperature not exceeding about 200° C.

7. In a process for the preparation of dry pigments suitable for incorporation into oil paint vehicles by simple mixing, whereby a homogeneous pigment oil paint vehicle mixture substantially free of pigment particles larger than 15 microns in diameter is formed, the steps which comprise separately adding to an acid reacting deflocculated pigment suspension substantially free of pigment particles larger than 15 microns in diameter, between about 0.01% and about 10%, based upon the weight of the pigment, of an anion active polar-nonpolar agent and between about 0.01% and about 10%, based upon the weight of the pigment, of a cation active polar-nonpolar agent, thereafter dewatering the pigment suspension and subsequently drying the pigment at a temperature not exceeding about 200° C.

8. In a process for the preparation of dry pigments suitable for incorporation in oil paint vehicles by simple mixing, whereby a homogeneous pigment oil paint vehicle mixture substantially free of pigment particles larger than 15 microns in diameter is formed, the steps which comprise deflocculating an aqueous pigment suspension with an alkaline reacting alkali metal compound, dividing the aqueous pigment slurry into two portions, adding to one portion a cation active polar-nonpolar agent and adding to the other portion of aqueous pigment slurry an anion active polar-nonpolar agent, mixing the two treated portions together with agitation, dewatering the pigment suspension and subsequently drying the pigment at a temperature not exceeding 175° C.

9. In a process for the preparation of dry pigments suitable for incorporation in oil paint vehicles by simple mixing, whereby a homogeneous pigment oil paint vehicle mixture substantially free of pigment particles larger than 15 microns in diameter is formed, the steps which comprise deflocculating an aqueous pigment suspension with an alkaline reacting alkali metal compound, dividing the aqueous pigment slurry into two portions, adding between about 0.01% and about 10%, based upon the weight of the pigment, of a cation active polar-nonpolar agent and adding to the other portion between about 0.01% and about 10%, based upon the weight of the pigment, of an anion active polar-nonpolar agent, mixing the two treated portions together with agitation, dewatering the pigment suspension and subsequently drying the pigment at a temperature not exceeding 175° C.

10. A dry pigment substantially free of pigment particles larger than 15 microns in diameter intimately associated with the reaction product of an anion active polar-nonpolar agent and a cation active polar-nonpolar agent, said pigment being suitable for incorporation into oil paint vehicles by simple mixing, whereby a homogeneous pigment oil paint vehicle mixture is formed.

11. A dry pigment substantially free of pigment particles larger than 15 microns in diameter intimately associated with the reaction product of between about 0.01% and about 10%, based upon the weight of the pigment, of an anion active polar-nonpolar agent and between about 0.01% and about 10% based upon the weight of the pigment of a cation active polar-nonpolar agent, said pigment being suitable for incorporation into oil paint vehicles by simple mixing, whereby a homogeneous pigment oil paint vehicle mixture is formed.

CLIFFORD K. SLOAN.